United States Patent Office 2,701,759
Patented Feb. 8, 1955

2,701,759

HERBICIDAL COMPOSITIONS

Albert W. Feldman, North Haven, and Allen E. Smith, Oxford, Conn., assignors to United States Rubber Company, New York, N. Y., a corporation of New Jersey No Drawing. Application January 16, 1952,
Serial No. 266,791

6 Claims. (Cl. 71—2.5)

This invention relates to herbicidal compositions.

The use of herbicides in agriculture is rapidly increasing and has now reached the point where it is common practice to treat the soil either before or after the crop has been planted to eliminate or retard weed growth. Mechanization of the growing of certain crops is limited since row weeding still necessitates the use of hand labor. Selective herbicides that could be applied to the planted row to curtail or eliminate weeds yet allow the normal development of the crop would be a tremendous impetus to mechanization of the growing of cotton, legumes, and many other crops. Certainly chemical weed control under any system of farming, whether mechanized or not, can provide a means of assuring good crop development with a saving of expensive hand labor. Several requirements on the part of the chemical must be met in order to justify its use as a selective preemergence herbicide. Lack of injury to the agronomic crop is, of course, necessary. Further, it is very important that the chemical render a high degree of weed control, even under very adverse conditions, until the agronomic crop has developed to the stage where mechanical cultivation can be practiced.

U. S. Patent 2,556,665 discloses the use of N-aryl phthalamic acids and their salts and esters as plant growth regulants and phytocides.

We have found that hydrocarbon oils have a synergistic effect on N-(1-naphthyl)-phthalamic acid and its salts and esters when used as pre-emergence herbicides.

Herbicidal compositions comprising N-(1-naphthyl)-phthalamic acid or its salts or esters together with the hydrocarbon oil exhibit considerably greater weed control over a longer period of time, are of practical effectiveness at lower doses, and withstand more adverse climatic conditions than similar compositions without the oil. They are distinctly safer on some agronomic crops, such as cucurbits. The hydrocarbon oil may be paraffinic, olefinic, alicyclic, aromatic, or a mixture thereof, and should boil above 150° C. While it is known that oils of some of these types may be phytotoxic per se when applied in high dosages, they are inefficient as pre-emergence herbicides in the absence of the N-(1-naphthyl)-phthalamic acid or its salts or esters. The addition of hydrocarbon oil to N-(1-naphthyl)-phthalamic acid, its salts and esters, according to the teachings of the present invention, does, however, give more practical weed control over a much longer period than the N-(1-naphthyl)-phthalamic acid, its salts or esters alone, as will be seen in the examples below.

The amount of hydrocarbon oil synergist in the compositions of the present invention may be from 1 to 2000 parts per part of the N-(1-naphthyl)-phthalamic acid or per part of the acid equivalent of the salts or esters of the N-(1-naphthyl)-phthalamic acid. All parts and percentages referred to herein are by weight. The amount of hydrocarbon oil applied to the soil surface may be from 5 to 1000 pounds per acre and the amount of N-(1-naphthyl)-phthalamic acid or its salts or esters may be from 0.5 to 50 pounds per acre of N-(1-naphthyl)-phthalamic acid equivalent. The compositions of the present invention containing the hydrocarbon oil and the N-(1-naphthyl)-phthalamic acid or its salts or esters may be applied to the soil surface. The compositions may contain a powdered solid carrier, such as the various mineral silicates, e. g. mica, talc, pyrophyllite or clays and be applied as dusts. The compositions may be applied as a spray in aqueous solution or suspension which may contain a surface-active dispersing agent. Such surface-active dispersing agent may be anionic, non-ionic or cationic as in U. S. Patent 2,556,665. The hydrocarbon oil and N-(1-naphthyl)-phthalamic acid, or its salts or esters, may be admixed with powdered solid carriers, such as mineral silicates, together with a surface-active dispersing agent so that a readily wettable powder may be obtained which may be applied directly to the ground, or which may be shaken up with water to readily prepare an aqueous suspension of the oil and chemical and powdered carrier for application to the ground in that form. The compositions comprising the hydrocarbon oil and N-(1-naphthyl)-phthalamic acid, or its salts or esters, may be applied to the ground by the aerosol method.

EXAMPLE I

*Pre-emergence tests in the greenhouse*

Eight cc. of 0.25% aqueous dispersions of N-(1-naphthyl)-phthalamic acid and of n-propyl-N-(1-naphthyl)-phthalamate, containing 5% of a hydrocarbon oil comprising a large percentage of unsaturated and aromatic hydrocarbons considered phytotoxic, and containing 0.5% of a non-herbicidal surface-active dispersing agent (condensation product of ethylene oxide with an alkylated phenol), were added to 60 cc. of water and the dispersions watered onto the surface of the soil in 6 inch clay pots immediately after sowing with crab grass seed and a mixture of seeds containing both broad leaf and grassy weeds. Similar dispersions without the oil, and without the N-(1-naphthyl)-phthalamic acid or the n-propyl-N-(1-naphthyl)-phthalamate, were also watered onto the soil in other pots. Also a check was run with an aqueous solution containing only water and the surface-active agent. One month after planting, the treatments were evaluated for weed control with results as shown in the following table:

| Treatment | Control of Crab Grass | Control of Other Weeds |
| --- | --- | --- |
| Water+surface-active agent (check) | None | None. |
| Water+surface-active agent+oil | do | Do. |
| Water+surface-active agent+N-(1-naphthyl)-phthalamic acid. | Fair | Good. |
| Water+surface-active agent+n-propyl-N-(1-naphthyl)-phthalamate. | do | Fair. |
| Water+surface-active agent+N-(1-naphthyl)-phthalamic acid+oil. | Very good | Excellent. |
| Water+surface-active agent+n-propyl-N-(1-naphthyl)-phthalamate+oil. | Excellent | Do. |

Tests similar to the above were run with a composition according to the present invention comprising n-propyl-(1-naphthyl)-phthalamate and a paraffinic mineral oil free of phytotoxic hydrocarbons with the following results:

| Treatment | Control of Crab Grass | Control of Other Weeds |
| --- | --- | --- |
| Water+surface-active agent (check) | None | None. |
| Water+surface-active agent+oil | do | Do. |
| Water+surface-active agent+n-propyl-N-(1-naphthyl)-phthalamate. | Fair | Fair. |
| Water+surface-active agent+n-propyl-(1-naphthyl)-phthalamate+oil. | Very good | Excellent. |

*Pre-emergence tests in the field*

The formulations used in the field tests were prepared by blending 5 and 10 parts of N-(1-naphthyl)-phthalamic acid and 1 part of the surface-active agent used in Example I. The blends were suspended in 1200 parts of water (for controls without the oil) and also were mixed with 40 parts of the oil containing unsaturated and aromatic hydrocarbons used in Example I and dispersed in 1160 parts of water (for compositions according to the present invention). Untreated checks, and checks with 1 part of the surface-active agent in 1200 parts of water and with 1 part of the surface-active agent and 40 parts of the oil in 1160 parts of water were also run. The formulations were sprayed over the surface of the soil after the crops (soybeans, flax, snap beans, cotton, squash, and pumpkin) were planted but before emergence of either the crops or weeds. In some cases the area treated comprised eight inch strips centered on the rows; in other tests whole blocks (of 320 square feet) planted to the above crops were sprayed. The treatment deposited 150 gallons of spray mixture (5 or 10 pounds of chemical) per acre on the area actually treated. Weed densities on the basis of 100% weed density for the untreated (check) plots were scored three and six weeks after treatment with the results shown in the following table:

| Treatment | Weed Density (percent) | |
|---|---|---|
| | After 3 Weeks | After 6 Weeks |
| None (check) | 100 | 100 |
| Water + surface-active agent (check) | 100 | 100 |
| Water + surface-active agent + oil (check) | 95 | 100 |
| Water + surface-active agent + N-(1-naphthyl)-phthalamic acid at 5 lbs./acre rate | 12 | 54 |
| Water + surface-active agent + oil + N-(1-naphthyl)-phthalamic acid at 5 lbs./acre rate | 6 | 20 |
| Water + surface-active agent + N-(1-naphthyl)-phthalamic acid at 10 lbs./acre rate | 4 | 36 |
| Water + surface-active agent + oil + N-(1-naphthyl)-phthalamic acid at 10 lbs./acre rate | 0 | 8 |

None of the agronomic crops were injured by the above treatments except for a slight injury to the cucurbits (squash and pumpkin) with the N-(1-naphthyl)-phthalamic acid without the oil at the 10 lbs./acre rate. The weed population in the checks consisted of a variety of common monocotyledonous and dicotyledonous plants which had completely overgrown the test area.

Having thus described our invention, what we claim and desire to protect by Letters Patent is:

1. The method of controlling weeds in soil which comprises applying to the soil surface before emergence of weeds a herbicidal amount of a composition comprising an aqueous dispersion of hydrocarbon oil which boils above 150° C. and material selected from the group consisting of N-(1-naphthyl)-phthalamic acid, its salts and esters.

2. The method of controlling weeds in soil which comprises applying to the soil surface before emergence of weeds a herbicidal amount of a composition comprising an aqueous dispersion of hydrocarbon oil which boils above 150° C. and material selected from the group consisting of N-(1-naphthyl)-phthalamic acid, its salts and esters, the amounts of said materials being from 5 to 1000 pounds of said oil per acre and from 0.5 to 50 pounds of N-(1-naphthyl)-phthalamic acid equivalent per acre.

3. The method of controlling weeds in soil which comprises applying to the soil surface before emergence of weeds a herbicidal amount of a composition comprising an aqueous dispersion of hydrocarbon oil which boils above 150° C. and N-(1-naphthyl)-phthalamic acid.

4. The method of controlling weeds in soil which comprises applying to the soil surface before emergence of weeds a herbicidal amount of a composition comprising an aqueous dispersion of hydrocarbon oil which boils above 150° C. and N-(1-naphthyl)-phthalamic acid, the amount of said materials being from 5 to 1000 pounds of said oil per acre and from 0.5 to 50 pounds of N-(1-naphthyl)-phthalamic acid per acre.

5. The method of controlling weeds in soil which comprises applying to the soil surface before emergence of weeds a herbicidal amount of a composition comprising a carrier and hydrocarbon oil which boils above 150° C. and material selected from the group consisting of N-(1-naphthyl)-phthalamic acid, its salts and esters.

6. The method of controlling weeds in soil which comprises applying to the soil surface before emergence of weeds a herbicidal amount of a composition comprising a carrier and hydrocarbon oil which boils above 150° C. and material selected from the group consisting of N-(1-naphthyl)-phthalamic acid, its salts and esters, the amount of said materials being from 5 to 1000 pounds of said oil per acre and from 0.5 to 50 pounds of N-(1-naphthyl)-phthalamic acid equivalent of said salt per acre.

References Cited in the file of this patent

UNITED STATES PATENTS

| | | |
|---|---|---|
| 2,188,734 | Carswell | Jan. 30, 1940 |
| 2,510,839 | Schmidl | June 6, 1950 |
| 2,552,187 | Kosmin | May 8, 1951 |
| 2,556,665 | Smith et al. | June 12, 1951 |
| 2,557,618 | Stull | June 19, 1951 |
| 2,558,762 | Kohr et al. | July 3, 1951 |
| 2,567,987 | Baumgartner | Sept. 18, 1951 |

OTHER REFERENCES

"Agricultural Chemicals," August 1951, pages 34 and 35.